US011653747B2

(12) United States Patent
Hoeger

(10) Patent No.: US 11,653,747 B2
(45) Date of Patent: May 23, 2023

(54) METHOD AND APPARATUS FOR MULTI-ATTACHMENT ACCESSORY HOLDER

(71) Applicant: Illinois Tool Works Inc., Glenview, IL (US)

(72) Inventor: Michael V. Hoeger, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/941,838

(22) Filed: Jul. 29, 2020

(65) Prior Publication Data

US 2021/0030144 A1 Feb. 4, 2021

Related U.S. Application Data

(60) Provisional application No. 62/881,659, filed on Aug. 1, 2019.

(51) Int. Cl.
*A45F 5/02* (2006.01)
*A45F 5/00* (2006.01)

(52) U.S. Cl.
CPC .............. *A45F 5/004* (2013.01); *A45F 5/021* (2013.01); *A45F 2005/006* (2013.01); *A45F 2005/008* (2013.01)

(58) Field of Classification Search
CPC .... A45F 5/021; A45F 5/02; A45F 2200/0575; A45F 2200/0516; A45F 2005/006; A45F 2200/0525; A45F 2005/008; A45F 2005/026; A45F 2200/0508; A45F 2005/025; Y10S 224/93; Y10S 224/904; B25H 3/00; B25H 3/006

USPC ............ 224/183, 677, 930, 584, 269
See application file for complete search history.

(56) References Cited

U.S. PATENT DOCUMENTS

| 5,540,367 A | * | 7/1996 | Kauker | A45F 5/02 224/180 |
| 5,613,236 A | * | 3/1997 | Tajima | A45F 5/02 224/269 |
| 5,697,538 A | * | 12/1997 | Goldenberg | G08B 3/1058 224/676 |
| 5,887,776 A | * | 3/1999 | Munoz | A45F 5/00 224/575 |
| 6,484,918 B1 | * | 11/2002 | Lefebvre | A61B 7/02 224/678 |

(Continued)

FOREIGN PATENT DOCUMENTS

| CN | 202791230 U | 3/2013 |
| EP | 3225345 A1 | 10/2017 |
| WO | 2018070365 A1 | 4/2018 |

OTHER PUBLICATIONS

International Search Report, dated Oct. 8, 2020, in International application No. PCT/US2020/044265, filed on Jul. 30, 2020 (18 pages).

*Primary Examiner* — Adam J Waggenspack
(74) *Attorney, Agent, or Firm* — McAndrews, Held & Malloy, Ltd.

(57) ABSTRACT

Provided is a disclosure for a multi-attachment accessory holder that includes a main body configured to couple a first side of the main body to an accessory device. The main body is configured to hold a magnet, and the main body includes one or more coupling points for attaching an ancillary accessory.

18 Claims, 6 Drawing Sheets

(56) References Cited

U.S. PATENT DOCUMENTS

| | | | |
|---|---|---|---|
| 7,431,251 B2* | 10/2008 | Carnevali | F16M 13/00 |
| | | | 224/183 |
| 10,327,538 B2* | 6/2019 | Alexander | A45C 13/1069 |
| 10,470,529 B2* | 11/2019 | Chan | A45F 5/02 |
| 2002/0185509 A1* | 12/2002 | Wichman | A45F 5/021 |
| | | | 224/677 |
| 2003/0075576 A1* | 4/2003 | Condiff | A45F 5/02 |
| | | | 224/269 |
| 2004/0069822 A1* | 4/2004 | Condiff | A45F 5/00 |
| | | | 224/269 |
| 2006/0032876 A1* | 2/2006 | Goffinet | A45F 5/02 |
| | | | 224/183 |
| 2007/0241159 A1* | 10/2007 | Chang | A45F 5/02 |
| | | | 224/677 |
| 2007/0294863 A1 | 12/2007 | Johnson | |
| 2009/0302015 A1 | 12/2009 | Feitzlmaier | |
| 2013/0126565 A1 | 5/2013 | Rostami | |
| 2015/0309395 A1* | 10/2015 | Tomasewski | F16M 13/00 |
| | | | 455/575.1 |
| 2016/0061380 A1* | 3/2016 | Smith | F16M 13/022 |
| | | | 248/558 |

\* cited by examiner

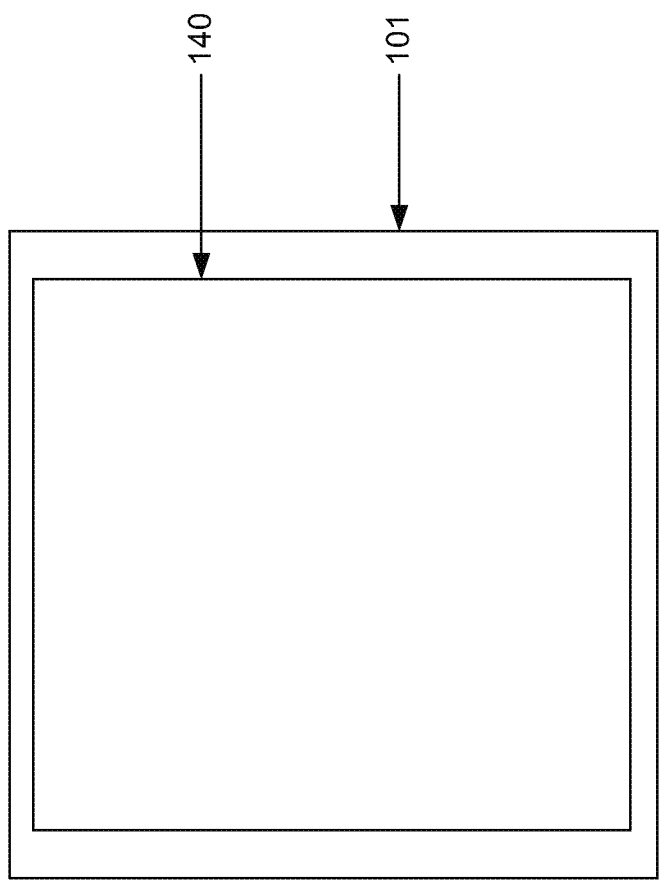

11,653,747 B2

METHOD AND APPARATUS FOR MULTI-ATTACHMENT ACCESSORY HOLDER

RELATED APPLICATIONS

This patent claims priority to U.S. Provisional Patent Application Ser. No. 62/881,659, filed Aug. 1, 2019, entitled "Method and Apparatus for a Multi-Attachment Accessory Holder." The entirety of U.S. Provisional Patent Application Ser. No. 62/881,659 is incorporated herein by reference.

BACKGROUND

The present disclosure relates to an accessory holder, and more particularly, to a method and apparatus for a multi-attachment accessory holder.

Some work environments may use accessory devices for controlling work equipment. For example, in a welding environment, there may be an accessory device such as a remote control device for controlling a power supply for a welder. It may be useful to have the accessory device close at hand and also secured so as not to lose the device or have it get in the way when it is bumped accidentally.

Limitations and disadvantages of conventional accessory holder for a work environment will become apparent to one of skill in the art through comparison of such approaches with some aspects of the present method and apparatus set forth in the remainder of this disclosure with reference to the drawings.

SUMMARY

Methods and apparatuses are provided for a multi-attachment accessory holder, substantially as illustrated by and described in connection with at least one of the figures, as set forth more completely in the claims.

BRIEF DESCRIPTION OF THE DRAWINGS

These and/or other aspects will become apparent and more readily appreciated from the following description of some example embodiments, taken in conjunction with the accompanying drawings.

FIG. 10 is a block diagram of an example main body of the accessory holder configured to encase an accessory, in accordance with aspects of the disclosure.

The figures are not necessarily to scale. Where appropriate, the same or similar reference numerals are used to refer to the same or similar components.

DETAILED DESCRIPTION

Various aspects of the disclosure are described for an accessory holder for various equipment that a user/worker, such as, for example, a welder, may use. An accessory used by a welder may be, for example, a remote control for a welding power supply. As the power supply may need to be controlled at various times, it will be convenient to have the remote control near the welder without getting in his way, or getting lost when it is dropped or moved out of the way. Providing multiple means for placing the accessory will allow the user choices on where to place the accessory for easy access.

Figure 1:
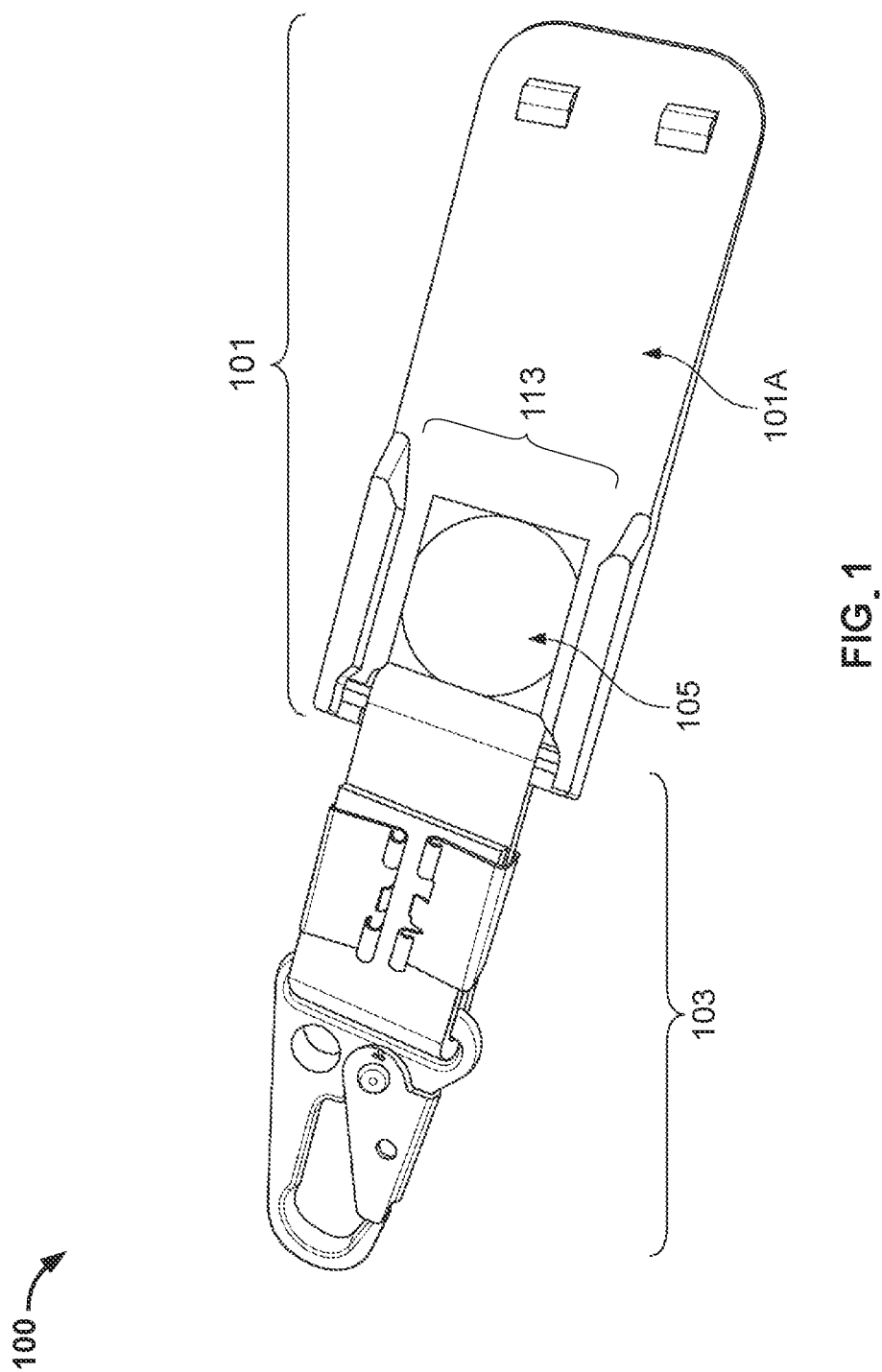
FIG. 1 is an illustration of a first side of an example accessory holder, in accordance with aspects of the disclosure.
Figure 7:
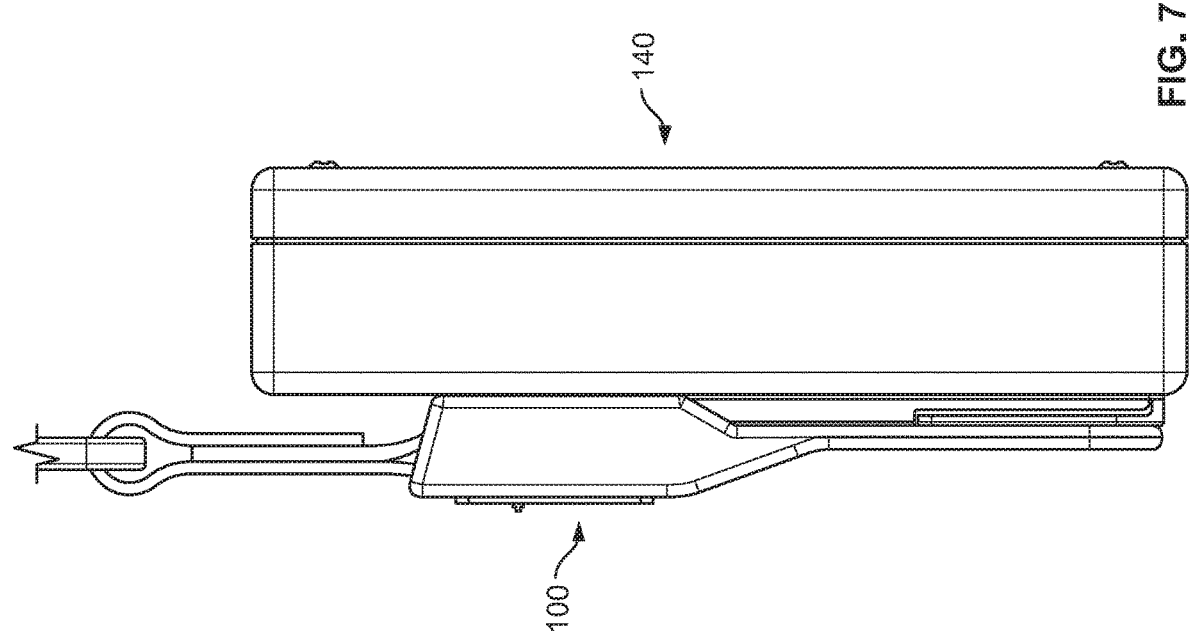
FIG. 7 is an illustration of an example accessory holder coupled to an accessory, in accordance with aspects of the disclosure.

FIG. 1 is an illustration of a first side of an example accessory holder, in accordance with an aspect of the disclosure. Referring to FIG. 1, there is shown a first side 101A of the example accessory holder 100 comprising a main body 101 that may be attached to an accessory 140 (FIG. 7). For example, the accessory 140 may be a remote control for a welding equipment.

The example accessory holder 100 is shown with an ancillary accessory 103 and a magnet 105. The accessory holder 100 may be equipped with one or both of the ancillary accessory 103 and the magnet 105. The example ancillary accessory 103 removably attaches the accessory holder 100 to various items for easy access to the accessory holder 100. The accessory holder 100 may be attached via the ancillary accessory 103 to, for example, an item of clothing such as a belt. The accessory holder 100 may also be attached via the ancillary accessory 103 to any nearby items such as, for example, a handle of an equipment used in the work environment. The accessory holder 100 may also use the ancillary accessory 103 to attach the accessory holder 100 to a body part such as, for example, a wrist or a waist of a user, or hang it around the neck of the user. Accordingly, the accessory holder 100 may be detached/removed, and then moved to another location as needed.

The ancillary accessory 103 may use any of a number of different devices for attaching the accessory holder 100 to an object. Example attachment devices that may be installed on the ancillary device 103 include a carabiner for attaching to an object, a hook for hanging on an object, a loop to place around an object, a hook-and-loop fastener for fastening to an object, a button to snap onto a receiving mated part or button into a buttonhole, etc. Additionally or alternatively, the ancillary accessory 103 may have a magnet so that the accessory holder 100 can be magnetically attached to an appropriate surface, while still allowing the accessory holder 100 to be moved closer to the user. In some examples, the ancillary accessory 103 is attached to an extendable/retractable cord so that the accessory holder 100 may be pulled away from the attached point by the user, and then retracted to keep it out of the way.

In place of, or in addition to the ancillary accessory 103, the accessory holder 100 includes a magnet 105 that is in a magnet holder 106 (FIG. 3) of the accessory holder 100. The magnet 105 may be used to attach the accessory holder 100 to appropriate surfaces to keep the accessory holder 100 in a convenient place for the user. For example, in a welding work environment, the accessory holder 100, which may be attached to a remote control for a welding equipment, the accessory holder 100 may be attached to a surface in the work environment to which the magnet 105 can adhere via its magnetic field.

Figure 2:
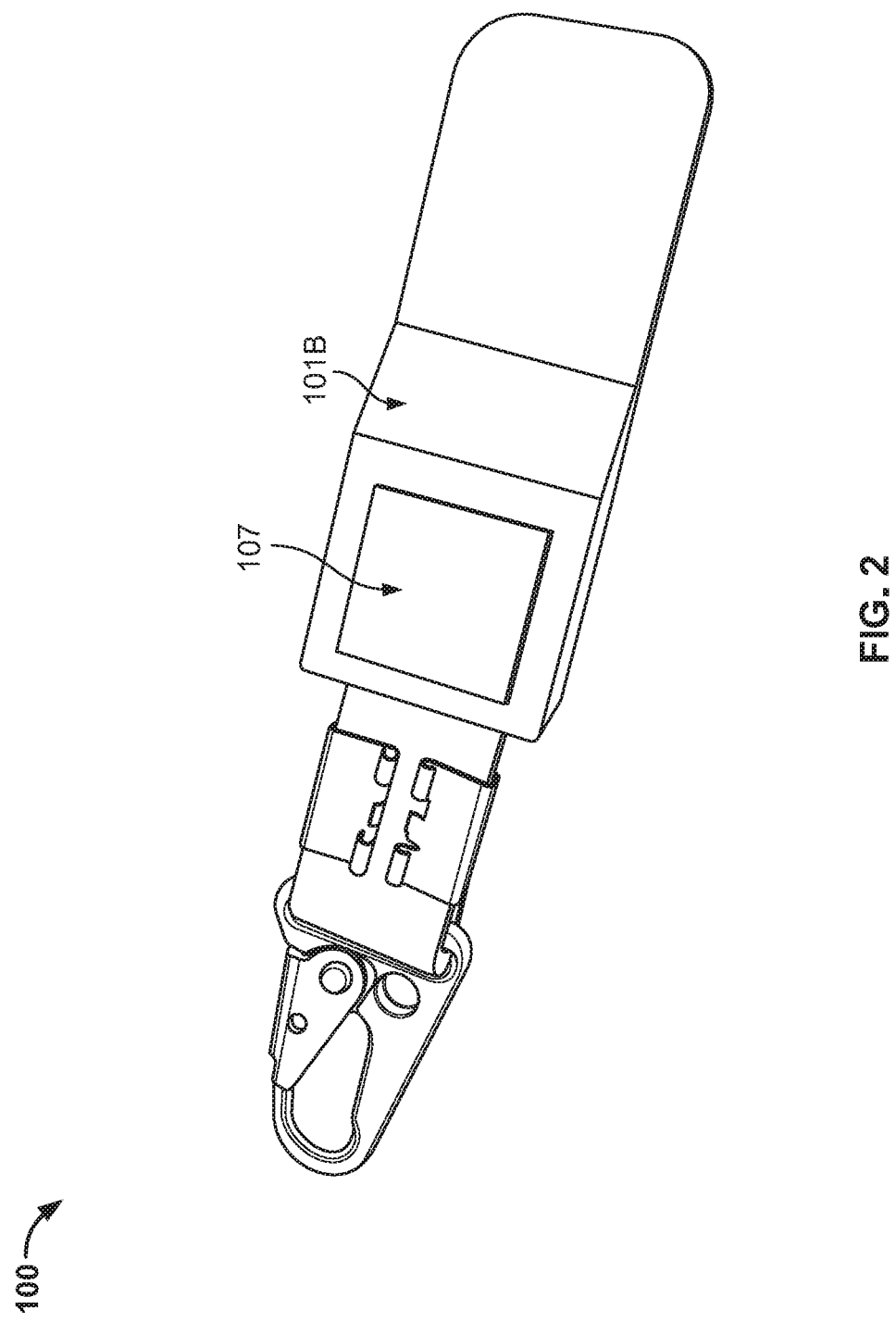
FIG. 2 is an illustration of a second side of the example accessory holder, in accordance with aspects of the disclosure.

FIG. 2 is an illustration of a second side of the example accessory holder 100 of FIG. 1. Referring to FIG. 2, there is shown a second side 101B of the main body 101 of the accessory holder 100. The second side 101B can also have an area 107 that may provide a better grip against a surface that the second side faces. For example, the area 107 may have a higher coefficient of friction than another part of the second side 101B. For example, the area 107 may comprise a rubber pad, may have a rougher surface than another part of the second side 101B, etc.

Figure 3:
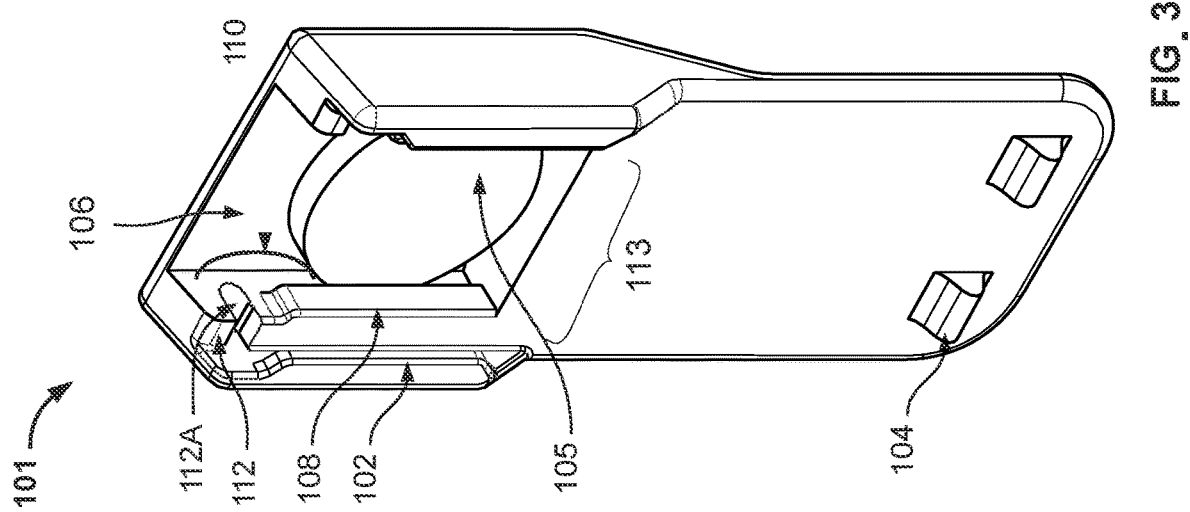
FIG. 3 is an illustration of a main body of the example accessory holder, in accordance with aspects of the disclosure.

FIG. 3 is an illustration of a main body of the example accessory holder 100 of FIG. 1. Referring to FIG. 3, there is shown the main body 101 of the accessory holder 100, where the main body 101 includes a fixing mechanism 102, one or more tabs 104, a magnet tray 106, magnet tray lip 108, a magnet holder 110, and a coupling point 112.

The example fixing mechanism 102 detachably attaches the main body 101 to an accessory 140 (FIG. 7) using, for example, a method similar to tongue and groove (e.g., one of the tongue or groove is on the main body 101, and the other of the tongue or groove is on the accessory 140). As illustrated, the fixing mechanism 102 can generally define a cavity 113 between the generally parallel set of tongues (or grooves, as the case may be) on the main body 101. The cavity 113 is configured to receive at least a portion of the accessory 140, as best illustrated in FIG. 7. Accordingly, the main body 101 may slide onto the accessory 140 to couple the accessory 140 to the main body 101. The main body 101 may also be more firmly fixed in place, or have additional lateral stability, when the pad(s) 104 fit into corresponding recess(es) of the accessory 140. Some examples use a single tab 104 that may, for example, extend substantially across a width of the main body 101. Other examples include multiple tabs 104. Accordingly, the size of the tabs 104 may depend on, among other things, the number of tabs 104. The layout of the tabs 104 may be different for different aspects of the disclosure. For example, the orientation of tabs 104 may be different where multiple tabs 104 may be aligned in a column or in any other angular orientation rather than in a row as shown in FIGS. 3 and 4, there may be tabs 104 in a plurality of orientations, etc.

The magnet tray 106 may be substantially open as shown in FIG. 3, partially closed, or entirely closed. In some examples, as illustrated, the magnet tray 106 can be positioned within or behind the cavity 113 (e.g. further recessed). Examples in which the magnet tray 106 is substantially open include magnet tray lips 108 to keep the magnet 105 in the magnet tray 106. There may also be one or more magnet holders 110 to keep the magnet 105 from falling out. The magnet holder 110 may be, for example, a snap fit that deforms to allow the magnet to be inserted or removed. After the magnet is inserted, the snap fit will resume its normal shape or substantially resume its normal shape to keep the magnet in place. The snap fit may be integrated as a part of the main body 101, or the snap fit may fit into, for example, appropriate recesses in the main body 101. Once the magnet 105 is removed, the magnet holder 110 can go back to its normal shape. For example, the snap fit may be similar to a leaf spring or other similar devices.

Figure 4:
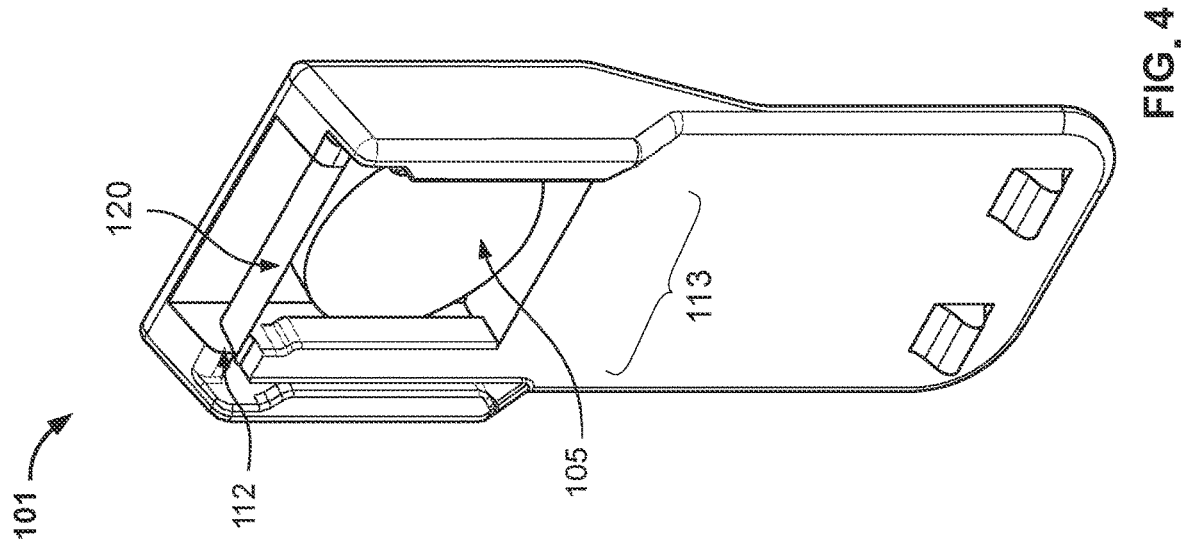
FIG. 4 is another illustration of the main body of the example accessory holder, in accordance with aspects of the disclosure.

The coupling point 112 may have a receiving portion 112A to allow a pin such as, for example, a dowel pin 120 of FIG. 4, to be removably snapped into it. Other aspects of the disclosure may not have the coupling point 112.

While various labels in FIG. 3 only point to one of the various features for the sake of simplicity, it should be understood that other examples may use a two or more of the fixing mechanisms 102 and/or a two or more magnet tray lips 108. Similarly, the coupling point 112 may include two or more coupling points 112 to accept a single dowel pin 120 (FIG. 4), but will generally be referred to as the coupling point 112.

Also, while the main body 101 is described with the various features, various examples of the disclosure need not be limited so. For example, some examples may have different sets of features for accepting and securing the magnet 105, or some examples may have different number of tabs in various locations, etc.

In some examples, the magnet 105 and/or another magnet (not shown) couple the accessory holder 100 to the accessory 140 (FIG. 7). In such examples, the accessory holder 100 may omit the fixing mechanisms 102 and/or the tab 104.

FIG. 4 is another illustration of the main body of the example accessory holder, in accordance with an aspect of the disclosure. Referring to FIG. 4, there is shown a dowel pin 120 that fits into the coupling points 112. The dowel pin 120 may be used in addition to or in place of the magnet holders 110 to keep the magnet 105 in place. Accordingly, the main body 101 may comprise one or both of the coupling point 112 and the magnet holder 110.

Additionally, the dowel pin 120 may be used to attach the ancillary accessory 103 to the main body 101. The ancillary accessory 103 may be attached to the main body 101 via a separate dowel pin 120, or the dowel pin 120 may be attached to the ancillary accessory 103.

Figure 5:
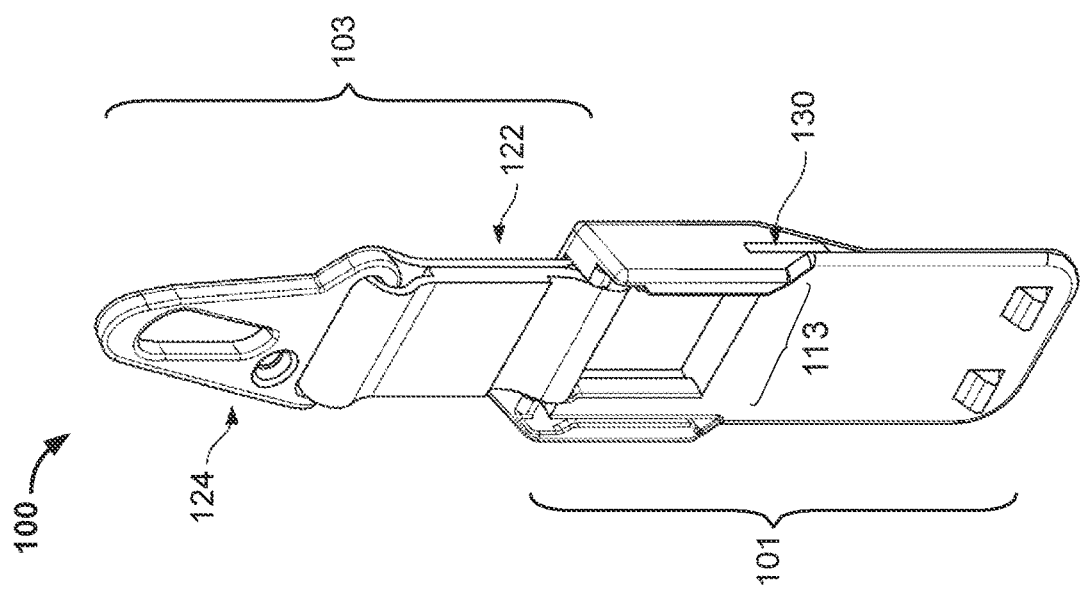
FIG. 5 is an illustration of an example of the accessory holder with the ancillary accessory and a second coupling point, in accordance with aspects of the disclosure.
Figure 8:
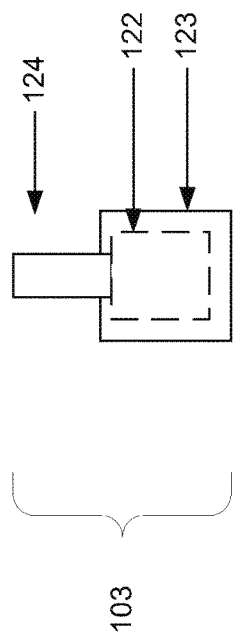
FIG. 8 is a block diagram of an example flexible ancillary accessory, in accordance with aspects of the disclosure.

FIG. 5 is an illustration of an example of the accessory holder 100 with the ancillary accessory and a second coupling point. Referring to FIG. 5, there is shown the ancillary accessory 103 attached to the main body 101. The example ancillary accessory 103 includes the extension portion 122 and the attaching portion 124. The extension portion 122 may be, for example, a flexible part such as a strap, or a rigid part such as a rod. The extension portion 122 may also be configured so that it can extend/retract out of/into a case (FIG. 7), or telescope out and in (FIG. 8). For simplicity, the extension portion 122 may be described as attaching to the main body 101 via, for example, the dowel pin 120. However, it should be understood that the extension portion 122 may be attached to the main body 101 via any of various devices/methods well known in the art, including, for example, a hook-and-loop fastener, button that snaps in, etc.

The attaching portion 124 is shown in FIG. 5 as a carabiner. However, the attaching portion 124 may be implemented using, for example, a hook for hanging on an object, a loop to place around an object, a hook-and-loop fastener for fastening to an object, a button to snap onto a receiving mated part or button into a buttonhole, etc.

FIG. 5 also illustrates another attaching point 130 where the ancillary accessory 103 may attach to the main body 101. In this way, the accessory 140 (FIG. 7) may be viewed in different orientation when the accessory holder 100 is attached to an object using the ancillary accessory 103. An example of the disclosure need not be limited in the number of attaching points, or in their locations.

Figure 6:
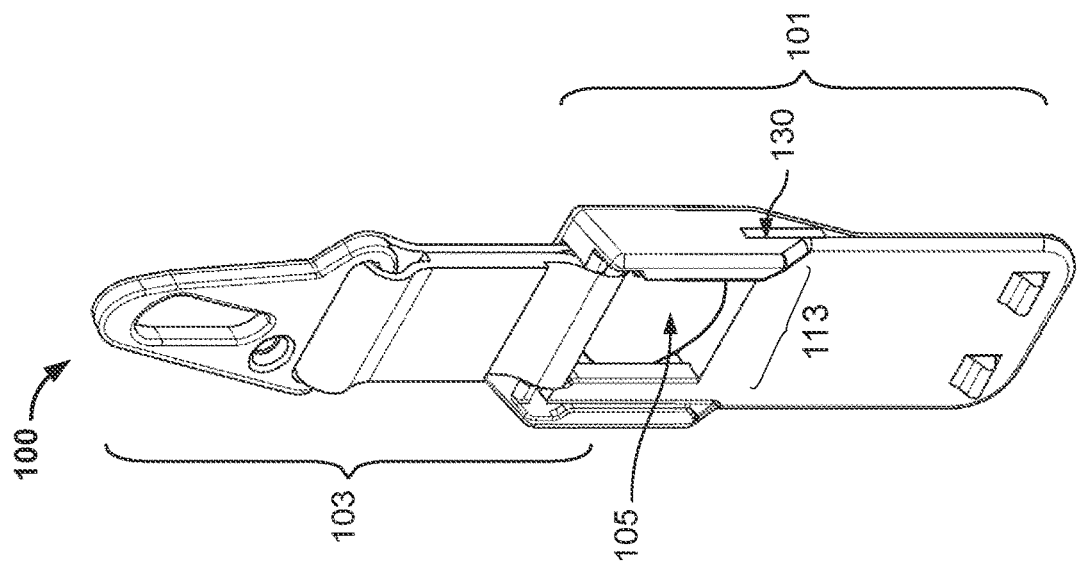
FIG. 6 is an illustration of an example accessory holder with the ancillary accessory, a magnet, and a second coupling point, in accordance with aspects of the disclosure.

FIG. 6 is an illustration of an example accessory holder with the ancillary accessory, a magnet, and a second coupling point. Referring to FIG. 6, there is shown the accessory holder 100 with the ancillary accessory 103, the magnet 105, and the additional attaching point 130.

FIG. 7 is an illustration of an example accessory holder coupled to an accessory. Referring to FIG. 7, there is shown the accessory holder 100 attached to an accessory 140. The accessory 140 may be, for example, a wireless controller for a welding power supply.

FIG. 8 is a block diagram of an example flexible ancillary accessory. Referring to FIG. 8, there is shown the ancillary accessory 103, the extension portion 122, and the attaching portion 124. As an example, the extension portion 122 may be encased in a case 123, and the extension portion 122, which may be connected to the attaching portion 124, may be pulled from the case 123 or retracted into the case 123 to adjust the reach of the extension portion 122. The attaching portion 124 may be any of different devices for attaching/coupling one item to another, including devices/methods well known in the art, including, for example, a carabiner, a hook, a hook-and-loop fastener, a loop, a button that snaps in, a button that buttons into a buttonhole, etc.

FIG. 8 is just an example of an adjustable length extension portion 122. Other examples may use other means of adjusting its length.

Figure 9:
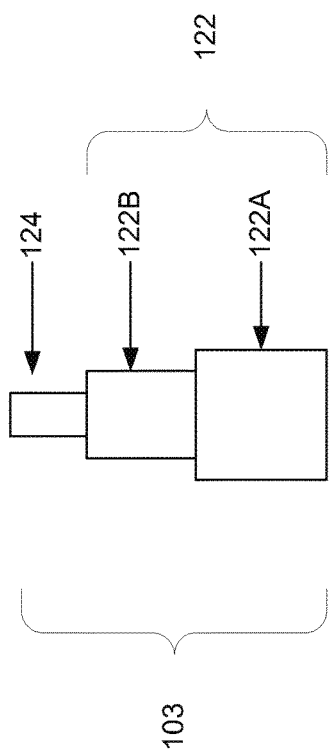
FIG. 9 is a block diagram of an example rigid ancillary accessory, in accordance with aspects of the disclosure.

FIG. 9 is a block diagram of an example rigid ancillary accessory. Referring to FIG. 9, there is shown the ancillary accessory 103, the extension portion 122, and the attaching portion 124. The extension portion 122 may include, for example, a plurality of telescoping parts 122A ... 122B. In one aspect of the disclosure, the extension portion 122 may be adjusted to a desired length, and then fixed at that length by turning the telescoping part 122A with respect to the telescoping part 122B, as is well-known in the art. In another aspect of the disclosure, the telescoping part 122A may comprise a ridge that fits into different indents in the telescoping part 122B, or vice versa. The length of the extension portion 122 may be adjusted using any of the various methods known in the art. The attaching portion 124 may be any of different devices for attaching/coupling one item to another, including those devices/methods well known in the art, including, for example, a hook-and-loop fastener, button that snaps in, etc.

FIG. 9 is just one example of an adjustable length extension portion 122. Various examples of the disclosure may use other means of adjusting its length. The attaching portion 124 may be any of different devices for attaching one portion to another, including those devices/methods described above, for example, in FIG. 8.

FIG. 10 is a block diagram of an example main body of the accessory holder configured to encase an accessory, in accordance with an aspect of the disclosure. Referring to FIG. 10, there is shown the main body 101 into which the accessory 140 is inserted such that at least the display portion of the accessory 140 is visible. The main body 101 may have similar parts to the main body 101 of FIGS. 1-9, such as, for example, being configured to attach to the ancillary accessory 103 and hold the magnet 105.

Accordingly, an example of the disclosure may be a multi-attachment accessory holder that includes a main body configured to couple a first side of the main body to a welding accessory, a magnet tray on the main body configured to hold a magnet, and one or more coupling points on the main body for attaching an ancillary accessory to the main body. At least one of the one or more coupling points may comprise a receiving portion to accept a dowel pin on a first end of the ancillary accessory. As an example, at least one of the one or more coupling points may comprise a dowel pin to attach to a first end of the ancillary accessory, where the dowel pin may be removable from the coupling point. A second end of the ancillary accessory may have an attaching mechanism configured to attach to another object. The ancillary accessory may be configured to extend out and retract in.

The multi-attachment accessory holder may have a fixing mechanism to attach the multi-attachment accessory holder to the welding accessory, and may have a magnet holder for securing the magnet in the magnet tray. The magnet holder may comprise at least one integrated snap fit.

The multi-attachment accessory holder may comprise one or more tabs on the first side of the main body configured to be inserted a recessed portion of the accessory to provide stability for the multi-attachment accessory holder. The multi-attachment accessory holder may also comprise material on a portion of a second side of the main body that has a higher coefficient of friction than another portion of the second side, such as, for example, a rubber pad.

Another example of the disclosure may be a multi-attachment accessory holder, comprising a main body configured to hold a welding accessory, where the welding accessory is inserted into a cavity in the main body; a magnet tray on the main body configured to hold a magnet; and one or more coupling points on the main body for attaching a first end of an ancillary accessory to the main body. The accessory holder may have at least one magnet holder for securing the magnet in the magnet tray. The magnet holder may be, for example, an integrated snap fit.

Some examples may comprise at least one of the one or more coupling points with a dowel pin to attach to the first end of the ancillary accessory, where the dowel pin may be removable from the coupling point. At least one of the one or more coupling points may comprise a receiving portion to accept a dowel pin on the first end of the ancillary accessory. A second end of the ancillary accessory may comprise an attaching mechanism configured to attach to another object. Material on a portion of a second side of the main body may have a higher coefficient of friction than another portion of the second side.

As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A multi-attachment accessory holder, comprising:
an ancillary accessory having a first end and a second end, wherein the ancillary accessory is configured to removably attach the multi-attachment accessory holder to an object;
a main body configured to couple a first side of the main body to a welding accessory via a tongue and groove technique;
a magnet tray on the main body configured to hold a magnet; and
one or more coupling points on the main body configured to engage a corresponding coupling point positioned at the first end of the ancillary accessory, wherein the corresponding coupling point is a dowel pin, and at least one of the one or more coupling points comprises a receiving portion configured to accept the dowel pin.

2. The multi-attachment accessory holder of claim 1, wherein the dowel pin is removable from the receiving portion of the coupling point.

3. The multi-attachment accessory holder of claim 1, wherein the second end of the ancillary accessory comprises an attaching mechanism configured to attach to the object.

4. The multi-attachment accessory holder of claim 1, wherein the ancillary accessory is configured to extend out and to retract.

5. The multi-attachment accessory holder of claim 1, comprising a fixing mechanism to attach the multi-attachment accessory holder to the welding accessory.

6. The multi-attachment accessory holder of claim 1, comprising a magnet holder for securing the magnet in the magnet tray.

7. The multi-attachment accessory holder of claim 6, wherein the magnet holder comprises at least one integrated snap fit.

8. The multi-attachment accessory holder of claim 1, comprising one or more tabs on the first side of the main body configured to be inserted in a recessed portion of the welding accessory to provide stability for the multi-attachment accessory holder.

9. The multi-attachment accessory holder of claim 1, comprising material on a portion of a second side of the main body that has a higher coefficient of friction than another portion of the second side.

10. The multi-attachment accessory holder of claim 9, wherein the material is a rubber pad.

11. A multi-attachment accessory holder, comprising:
an ancillary accessory having a first end and a second end, wherein the ancillary accessory is configured to removably attach the multi-attachment accessory holder to an object;
a main body configured to hold a welding accessory via a tongue and groove technique, wherein the main body comprises a cavity configured to receive at least a portion of the welding accessory;
a magnet tray on the main body configured to hold a magnet; and
one or more coupling points on the main body configured to engage a corresponding coupling point of the first end of the ancillary accessory, wherein the corresponding coupling point is a dowel pin attached to the first end of the ancillary accessory.

12. The multi-attachment accessory holder of claim 11, comprising a magnet holder for securing the magnet in the magnet tray.

13. The multi-attachment accessory holder of claim 12, wherein the magnet holder comprises at least one integrated snap fit.

14. The multi-attachment accessory holder of claim 11, wherein the dowel pin is removable from the receiving portion of the coupling point.

15. The multi-attachment accessory holder of claim 11, wherein a second end of the ancillary accessory comprises an attaching mechanism configured to attach to the object.

16. The multi-attachment accessory holder of claim 11, comprising material on a portion of a second side of the main body that has a higher coefficient of friction than another portion of the second side.

17. An accessory holder, comprising:
a main body having a first side and a second side;
a first set of grooves formed on the first side and configured to engage a welding accessory;
a magnet tray on the main body and configured to retain a magnet via a second set of grooves;
a dowel pin; and
one or more receiving portions formed in or on the main body and configured to retain the dowel pin,
wherein, when the dowel pin is received in the one or more receiving portions, the magnet is secured within the magnet tray via the dowel pin.

18. The accessory holder of claim 17, wherein the dowel pin is configured to couple a first end of an ancillary accessory to the main body via the one or more receiving portions.

* * * * *